June 6, 1967     J. E. JACKSON     3,324,278

WELDING PROCESS

Filed Jan. 15, 1964

INVENTOR.

JOHN E. JACKSON

BY

ATTORNEY

3,324,278
WELDING PROCESS
John E. Jackson, Indianapolis, Ind., assignor to Union Carbide Corporation, a corporation of New York
Filed Jan. 15, 1964, Ser. No. 337,952
7 Claims. (Cl. 219—137)

This invention relates to a welding process and, more particularly, to an electric arc welding process for joining relatively thick work with a single-pass weld.

Single-pass electric arc welding is generally limited to work that is less than about ¼ in. thick. It has not been possible to single-pass weld work that is thicker than about ¼ in. without the aid of some means of weld backup, such as for example, carbon blocks or a gas backup. One of the problems is that of achieving full penetration of the weld without having the weld "drop through" the plate. That is due to the fact that the mass of metal made molten by the arc and forming the weld puddle in thick work is enough to "drop through" from its own weight. In thinner work, the mass of metal is not so great so that forces such as surface tension are enough to hold the weld puddle up.

In some cases, it has been necessary when thick plate was to be welded to prepare the weld joint; for example, a bevel or V-joint would be prepared and the weld made in several passes. This, of course, is expensive and time consuming.

With the above considerations in mind, an object of the invention is to provide a method of welding relatively thick work.

Another object is to provide an electric arc process for welding such work.

Another object is to provide an electric arc process for welding such work wherein the arc gas is continuously pulsated.

Yet another object is to provide a process for welding such thick workpieces wherein a pulsating gas flow is passed into an arc to become part of the arc plasma and then such arc plasma is passed through a water-cooled nozzle sufficiently proximate to such arc to produce a relatively stiff arc column.

Figure 1:
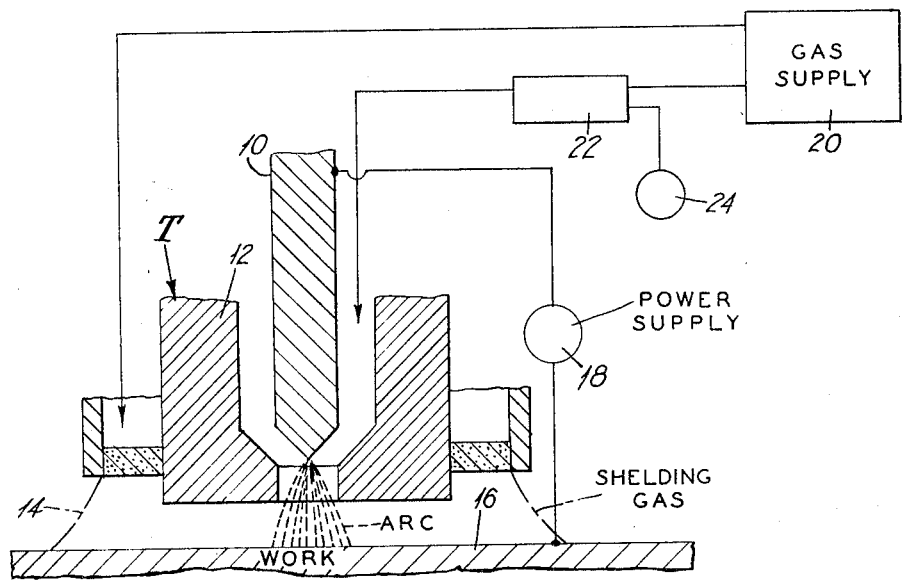
Figure 2:
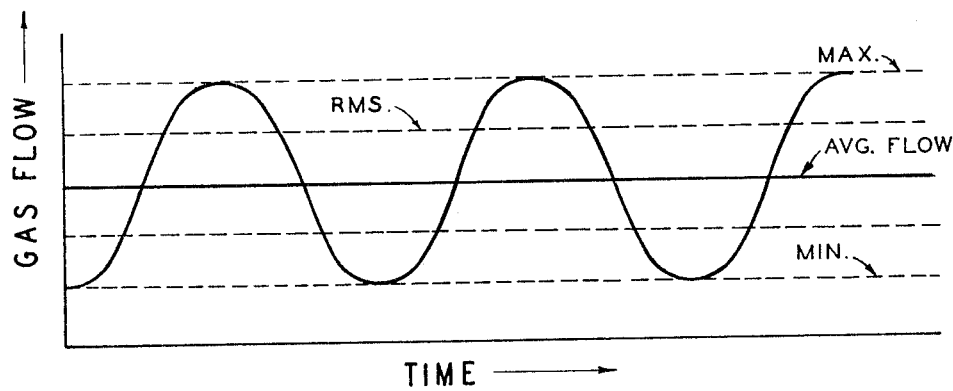

These and other objects will either be pointed out or become apparent from the following description and drawings wherein:

FIGURE 1 schematically illustrates an exemplary apparatus for carrying out the invention; and FIGURE 2 is a curve illustrating how gas flows are varied according to the invention.

In a general way the objects of the invention are achieved by a welding process wherein energy from a source of heat is directed to a localized zone on a workpiece to create a molten puddle. Generally in electric arc welding, a stream of gas which may be, for example, an arc gas or shielding gas, is impinged against the puddle. The forces acting on the weld puddle are continuously and smoothly increased and decreased in a pulsating manner. In the preferred embodiment, the pulsating force is achieved by increasing and decreasing the gas flow impinging on the weld puddle. The pulsating forces alternately bores a hole through the workpiece and then such hole fills in with molten metal.

In the broad aspect of the invention, the phenomenon of boring and filling which we call "drill-fill" can be achieved in electric arc welding by any manner wherein the forces on the puddle are continuously varied between a high and a low value. For example, the current to the arc can be modulated in addition to or instead of pulsating the gas flow.

For the purpose of simplifying the description, the invention will be discussed in terms of the preferred embodiment wherein the gas flows are varied to achieve the "drill-fill" phenomenon. This limitation is for illustrative purposes only and is not necessarily to be construed as a limitation on the scope of the invention.

It has been found that pulsating the forces acting on the weld puddle permits the attainment of fully penetrated welds without "drop through" on thick workpieces.

Proceeding now with a description of one embodiment of the invention, I have employed apparatus and process in which a gas stream is passed into an arc maintained between an electrode and a workpiece to produce an arc plasma and such arc plasma is passed through a fluid-cooled nozzle the walls of which are sufficiently proximate to said arc plasma to impart direction and stiffness thereto. By stiffness, I mean the arc plasma remains essentially invariant notwithstanding outside forces acting on said arc. Such a process is described in U.S. Patent No. 2,086,124 issued in the name of R. M. Gage.

I have discovered that by increasing and decreasing the gas flow in a continuously smooth manner that welds of the type shown in the drawings and to be discussed hereinafter can be achieved in thick work which heretofore could not be welded in a single pass without some mechanical aid. For purposes of this disclosure, thick workpieces contemplate thickness in excess of $\frac{3}{16}$ inch.

Referring to FIGURE 1, typical apparatus for carrying out the invention includes torch T having an electrode 10 enclosed in a nozzle 12. The torch T may also be provided with a shielding gas ring 14. The electrode 10 and workpiece 16 are connected in circuit relation with the power source 18. This mode of operation has come to be known as the transferred mode. The invention may also be practiced in the non-transferred mode.

In this embodiment as with most electric arc welding processes, a suitable gas is passed down around the electrode 10 and out through nozzle 12 to be directed against the workpiece at the weld zone. In this particular mode of operation, the gas passed around the electrode 10 becomes part of the arc column. Shielding gas is supplied to the ring 14. The gases may be from one source 20 or the gases may be different.

In operation, an arc is established by any suitable means such as by high frequency discharge for example, between the electrode 10 and work 16. The arc gas and shielding gas are turned on. Once the weld puddle is formed, the arc gas flow is pulsated. The pulsating is achieved in this case by passing the gas through a piston 22, the movement of which is controlled by a cam 24. Cam 24 provides the proper pulsating of the gas. When the gas flow and thus the force on the weld puddle is increased, a hole is "drilled" in the work. Then as the force is smoothly decreased, in a manner illustrated by the curve in FIGURE 2, the hole is "filled" by molten metal. This process is rapidly repeated as relative movement is provided between the torch and work. It should be clearly understood that the cam and piston arrangement is but one way of providing the pulsating gas flow and thus the pulsating force on the weld puddle. Another way of pulsating the gas flow may be achieved by varying the pressure of the gas with a properly selected regulator. Also, the same effect on the weld puddle may be achieved by modulating the current.

The manner of pulsating the gas flow is critical. The amplitude and frequency of oscillation should be properly controlled so that the gas flow increases and decreases with time so that the trace of the oscillation produces a continuously smooth sine curve. The pulsating gas flow should never be off completely. Preferably, the gas flow follows substantially a sine curve as shown in FIGURE 2. Pulsating the gas flow so that it has a sine wave form insures that the hole will be properly drilled and that it will not fill too quickly so as to cause splashing of the molten metal or in general cause nonuniformity in the weld. The exact amplitude and time variation will depend primarily on the material being welded and its thickness. The exact values must be determined for each case. For the purpose of this disclosure, amplitude is used to mean the root-mean-square (RMS) of the deviation from the average flow. As a guide to those skilled in the art for selecting the proper amplitude and time variation, the following two examples are provided by way of illustration.

*Example I*

In this example, apparatus similar to that illustrated schematically in FIGURE 1 was positioned about 3/16 inch above a 1/4 inch thick type 304 stainless steel plate. The electrode was a .090 inch diameter 2% thoriated tungsten electrode. The nozzle was a 3/16 inch I.D. 1/4 inch long nozzle. The electrode was flush with the nozzle exit. Argon arc gas was supplied to the torch through the piston arrangement described. The piston had a 3/4 inch diameter and a 2-inch stroke. The wheel driving the piston revolved at 50 r.p.m. The torch and work were connected across a conventional drooping characteristic power supply. An arc was established at 200 amps D.C.S.P. and about 21 volts. After a puddle was established, the arc gas had an average flow of 8.4 c.f.h. and the amplitude of the pulse was about 3 c.f.h. at a frequency of 50 c.p.m. Travel speed was about 5 i.p.m. FIGURES 3, 4 and 5 show the weld. There was no drop through of the weld puddle.

*Example II*

The apparatus used in this example was essentially the same as in Example I. In this case, the torch was positioned about 1/4 inch from a 1/2 inch 304 stainless steel plate. The electrode was 1/8 inch 2% thoriated tungsten spaced 1/8 inch back from the exit end of a 3/16 I.D. nozzle. Argon gas was used as both the arc gas and the shielding gas. The piston had a 3/4 inch diameter with a 4-inch stroke. The wheel turned at 26 r.p.m. The average arc gas flow was 6.3 c.f.h. and the shielding gas flow was 45 c.f.h. The weld was made with an arc current of 375 amps D.C.S.P. The arc gas was pulsated at an amplitude of 3.2 c.f.h. at a frequency of 26 c.p.m.

While the invention has been described with reference to pulsating the arc gas, it should be understood that the invention need not be so limited. A separate gas, other than the arc gas, could be directed at the weld puddle and pulsed in accordance with the teachings of this invention. Likewise, the heat source need not be that of an electric arc. For example, a radiation heat source could be used. The important criteria is that of proper pulsation of the forces acting on the weld puddle.

What is claimed is:

1. Process for welding work which comprises providing a heat source, directing energy from said heat source to a localized zone on said work to create a molten puddle; impinging a stream of gas against said puddle; alternately continuously increasing and decreasing the force of such gas impinging on said work to alternately bore a hole in the work and then filling in such hole with molten metal as relative movement is provided between said heat source and work.

2. Process for electric arc welding which comprises:
   (a) establishing an arc between an electrode and a workpiece;
   (b) directing said arc to a localized zone on said workpiece to create a molten puddle;
   (c) impinging a stream of gas against said puddle; and
   (d) continuously pulsating the stream of gas impinging on the weld puddle to alternately bore a hole therein and then filling in such hole with molten metal while providing relative motion between such arc and workpiece.

3. Process according to claim 2 wherein the stream of gas is pulsated so that the trace of such pulsated stream has a continuously smooth sine wave form.

4. Process for electric arc welding which comprises:
   (a) establishing an arc between an electrode and a workpiece;
   (b) directing said arc to a localized zone on said workpiece to create a molten pudddle;
   (c) introducing a gas stream into said arc to produce an arc plasma;
   (d) impinging said arc plasma against said puddle; and
   (e) continuously pulsating the force of said arc plasma acting on said molten puddle to alternately bore a hole in such work and then filling in such hole with molten metal while providing relative motion between the arc plasma and work.

5. Process according to claim 4 wherein the force of the arc plasma is pulsated by continuously increasing and decreasing the flow of arc gas introduced into said arc.

6. Process according to claim 4 wherein the arc plasma is passed through a fluid-cooled nozzle the walls of which are sufficiently proximate to said arc plasma to directionally stabilize same.

7. Process according to claim 4 wherein the force of the arc plasma is pulsated so that the trace of such pulsating force has a continuously smooth sine wave form.

References Cited

UNITED STATES PATENTS

| | | | |
|---|---|---|---|
| 2,987,610 | 6/1961 | Steigerwald | 219—117 |
| 3,102,948 | 9/1963 | McCampbell | 219—137 |

JOSEPH V. TRUHE, *Primary Examiner.*